United States Patent [19]

Lehmann

[11] Patent Number: 5,483,992
[45] Date of Patent: Jan. 16, 1996

[54] ANNULAR VALVE FOR A PISTON COMPRESSOR

[75] Inventor: Markus Lehmann, Oberstammheim, Switzerland

[73] Assignee: Maschinenfabrik Sulzer-Burckhardt AG, Basel, Switzerland

[21] Appl. No.: 378,307

[22] Filed: Jan. 25, 1995

Related U.S. Application Data

[62] Division of Ser. No. 237,943, May 2, 1994, abandoned, which is a continuation of Ser. No. 41,084, Apr. 1, 1993, abandoned.

[30] Foreign Application Priority Data

Jun. 2, 1992 [EP] European Pat. Off. ............. 92810421

[51] Int. Cl.$^6$ .................................................. F16K 15/12
[52] U.S. Cl. ..................... 137/516.21; 137/529
[58] Field of Search ................. 137/516.15–516.23, 137/529

[56] References Cited

U.S. PATENT DOCUMENTS

| | | | |
|---|---|---|---|
| 1,326,923 | 1/1920 | Frech | 137/516.17 |
| 1,354,318 | 9/1920 | Longacre | 137/516.21 |
| 1,416,637 | 5/1922 | Hart | 137/516.19 |
| 1,566,403 | 12/1925 | Hoffman | 137/516.17 |
| 1,593,914 | 7/1926 | Redfield | 137/516.19 |
| 1,735,205 | 11/1929 | Leinert | 137/516.21 |
| 2,000,691 | 5/1935 | Collins . | |
| 3,177,893 | 4/1965 | King | 137/516.15 X |
| 3,536,094 | 10/1970 | Manley . | |
| 4,196,746 | 8/1980 | Broyan | 137/516.17 X |
| 4,729,402 | 3/1988 | Blass . | |
| 4,854,341 | 8/1989 | Bauer | 137/516.21 X |

FOREIGN PATENT DOCUMENTS

| | | | |
|---|---|---|---|
| 692442 | 6/1940 | Germany | 137/516.21 |
| 430932 | 8/1967 | Switzerland . | |
| 251472 | 5/1926 | United Kingdom . | |
| 679079 | 9/1952 | United Kingdom . | |
| 1104308 | 2/1968 | United Kingdom | 137/529 |

*Primary Examiner*—Robert G. Nilson
*Attorney, Agent, or Firm*—Townsend and Townsend and Crew

[57] ABSTRACT

The annular valve (10) comprises a valve seat (11) attached in the housing (1) of the compressor, an absorber (14) attached thereto at a distance and an annular sealing component (12), which can move between the valve seat and the absorber. Helical springs (2), which move the sealing component in the closing direction towards the valve seat, are distributed over its periphery between the absorber and the sealing component. Each helical spring (2) is fastened with one end in the absorber (14). In the region of the other end of each helical spring (2), the sealing component (12) is provided with guide means (6) for the respective spring end.

2 Claims, 2 Drawing Sheets

ANNULAR VALVE FOR A PISTON COMPRESSOR

This is a Division of application Ser No. 08/237,943, filed May 2, 1994, now abandoned which is a continuation of Ser. No. 08/041,084, now abandoned filed Apr. 1, 1993.

BACKGROUND OF THE INVENTION

The invention relates to an annular valve for a piston compressor, having a valve seat attached in the housing of the compressor, an absorber attached thereto at a distance and at least one annular sealing component, which can move between the valve seat and the absorber, and at least three helical springs, which move the sealing component in the shutting direction towards the valve seal, being disposed between the absorber and the sealing component, distributed over its periphery. By an annular sealing component is to be understood both an annular member, which cooperates only with one opening or annular duct mounted in the valve seat, and also an annular plate, which cooperates with several openings or annular ducts mounted concentrically in the valve seat.

With known valves of this type having annular plates as the sealing component, the helical springs are only used to bring the sealing component into the closing position and to keep it there. To guide the sealing component during the opening and closing movement, the sealing component was guided either on a spacer ring disposed between the valve seat and the absorber, or so-called control arms, which are manufactured in one piece with the sealing component and the attachment ring, were provided between the sealing component and its attachment ring. Whereas the first-mentioned embodiment does not operate without friction because of the guidance of the sealing component at the spacer ring and therefore has to be lubricated with oil, the second embodiment does operate without friction and is therefore used in oil-free compressors; however it has the disadvantage that it requires more space because of the control arms. Furthermore breakdown may result if the control arms break.

SUMMARY OF THE INVENTION

The object of the invention is to improve annular valves of the aforementioned type so that they operate without friction and at the same time have a space-saving construction.

This object is achieved in accordance with the invention in that each helical spring is attached with one end in the absorber and in that in the region of the other end of each helical spring the sealing component is provided with guide means for the respective spring end.

By this structural design, apart from the closing function, the helical springs also perform the guide function for the sealing component, as a result of which the sealing component is guided without friction. Although the new valve does not require any lubrication, it may also be used in compressors with oil lubrication. Compared with the known annular valves in oil-free compressors, the new annular valve has a space-saving construction and the risk of breakdown is reduced, as it is no longer possible for control arms to break.

DESCRIPTION OF THE PREFERRED EMBODIMENTS

Figure 1:
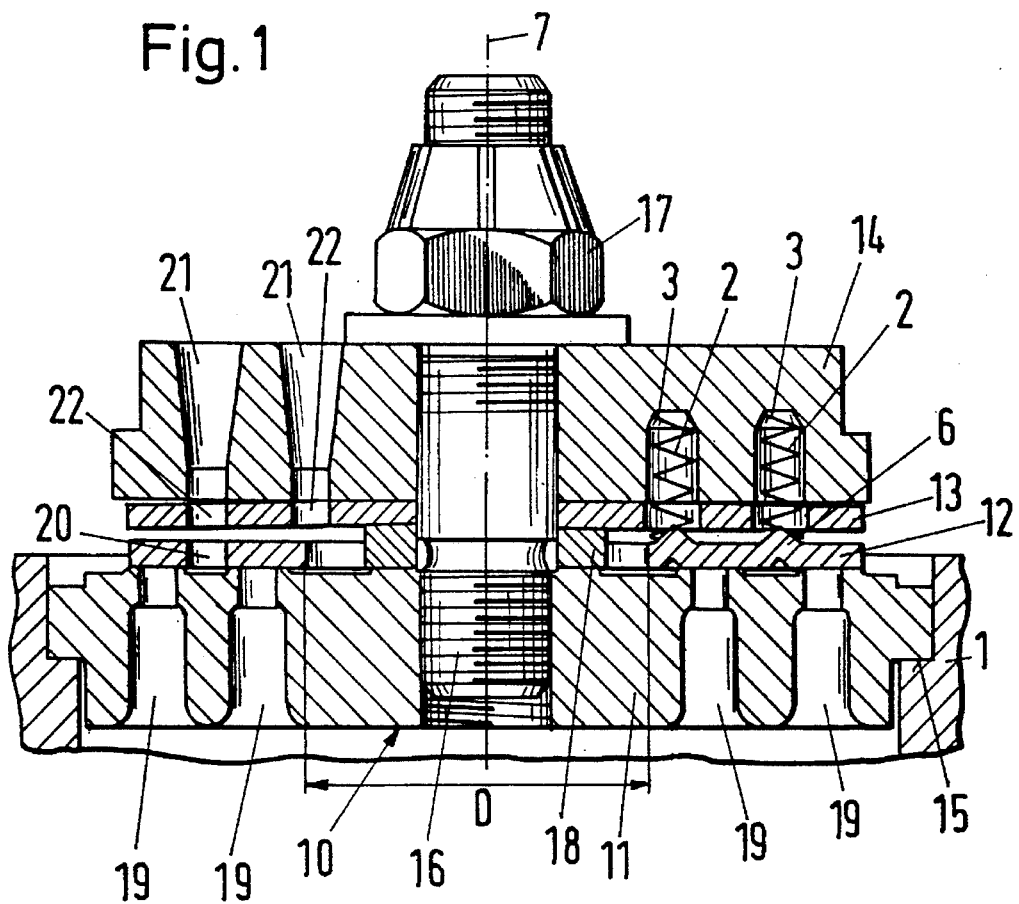
FIG. 1 is an axial section through an annular plate valve constructed according to the invention.

As shown in FIG. 1, in a housing 1 (not shown in greater detail) of a compressor is disposed a pressure valve 10 of the annular plate style, which essentially consists of a plate-shaped valve seat 11, a sealing component 12 in the form of an annular plate, a damping plate 13 and a plate-shaped absorber 14. The valve seat 11 rests with its edge on a shoulder 15 in the housing 1 and is retained in this housing by means of a distance piece (not shown), which presses the valve seat against the shoulder 15. Coaxially to the axis of symmetry 7 of the valve 10, a screw bolt 16, which penetrates the damping plate 13 and the absorber 14, is screwed in the valve seat 11. These parts 13 and 14 are attached to the valve seat 11 by means of a nut 17, with a spacing existing between the valve seat and the damping plate 13 to receive the movable annular plate 12. A spacer ring 18 surrounding the screw bolt 16 and disposed between the valve seat 11 and the damping plate 13 presses the damping plate against the absorber 14.

In the valve seat 11 on two different radii are provided openings 19, which extend in the peripheral direction of the valve seat and the path of which is interrupted at several points by radial webs. Between the openings 19 is located in the annular plate 12 an opening 20, which runs parallel to the openings 19. Corresponding to the two openings 19, two openings 21 are provided in the absorber 14, offset to the axis 7, which also extend in the peripheral direction and the path of which is interrupted at several places by radial webs. In alignment with the openings 21 are openings 22 in the damping plate 13. The openings 19, 20, 21 and 22 serve to let through the gas compressed in the compressor, which in FIG. 1 is located beneath the valve seat 11 and flows into a pressure line (not shown) by raising the annular plate 12 from the valve seat.

Figure 2:
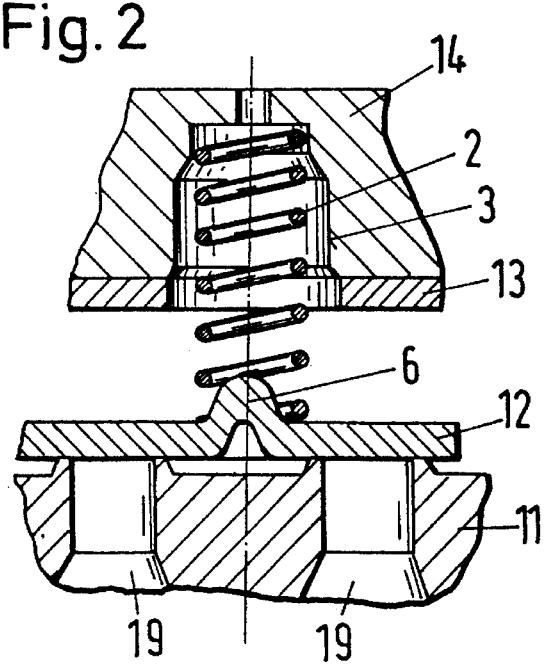
FIG. 2 is an enlarged detail of FIG. 1 in the region of a helical spring.

The movable annular plate 12, the internal diameter D of which is substantially larger than the external diameter of the spacer ring 18, so that after the removal of the annular plate 12 from the valve seat 11 there remains an adequate cross section of flow between the annular plate 12 and the spacer ring 18, is pressed against the valve seat 11 by several helical springs 2 disposed over the circumference of the annular plate, two of which are shown lying next to one another in the radial direction in FIG. 1. The helical springs 2 also serve to guide the annular plate 12. For this purpose each helical spring 2 is attached with its upper end in a drill hole 3 of the absorber 14—as can be seen in FIG. 2. The upper end of the drill hole 3 in FIG. 2 is adapted to the coil diameter of the helical spring 2 so that its uppermost coil becomes lodged in the bore hole when it is inserted therein. The remaining part of the drill hole 3 has a somewhat larger diameter, so that no contact occurs between the remaining spring coils and the drill hole 3. The other, lower end of the helical spring 2 in FIG. 2 surrounds a knob-like projection 6, which has been pressed out of the metal annular plate 12 by a stamping operation and thus serves as guide means for the helical spring 2, so that with this end it cannot move laterally on the annular plate. By the design described of the drill hole 3 and of the annular plate 12, a perfect guidance of the movable annular plate is achieved during the operation of the compressor, and in fact irrespective of in what position the valve is mounted on the compressor. In contrast to the position shown in FIGS. 1 and 2, the valve 10 can also be mounted so that the axis 7 of the valve lies horizontally.

Figure 3:
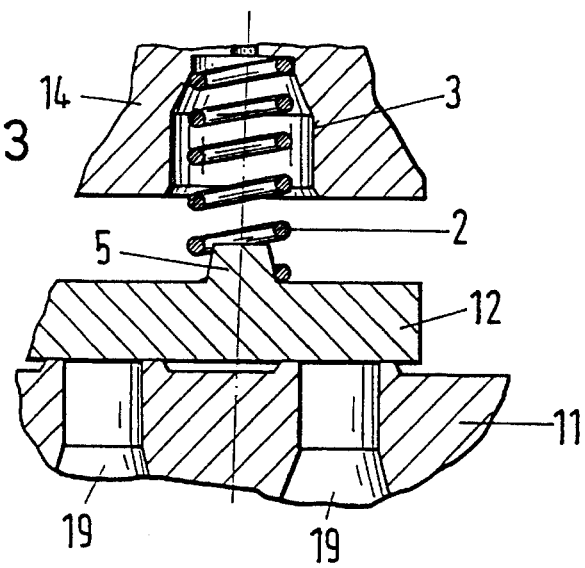
FIG. 3 and FIG. 4 are details corresponding to FIG. 2 and show two modified annular plates and FIG. 5 is a detail corresponding to FIG. 2 with an annular sealing component.

In the exemplified embodiment shown in FIG. 3, the annular plate valve 10 has the same construction as described with respect to FIG. 1, but the annular plate 12 is not made from metal, but from plastic. In this case a knob-like projection 5 is formed during molding or injecting the annular plate 12. The dimensions of the projection 5 are selected so that the end of the helical spring 2 at the bottom in FIG. 3 securely surrounds the projection 5, so that no relative movement occurs between the annular plate 12 and the spring end. As the annular plate 12 is made of plastic, a damping plate has been omitted.

Figure 4:
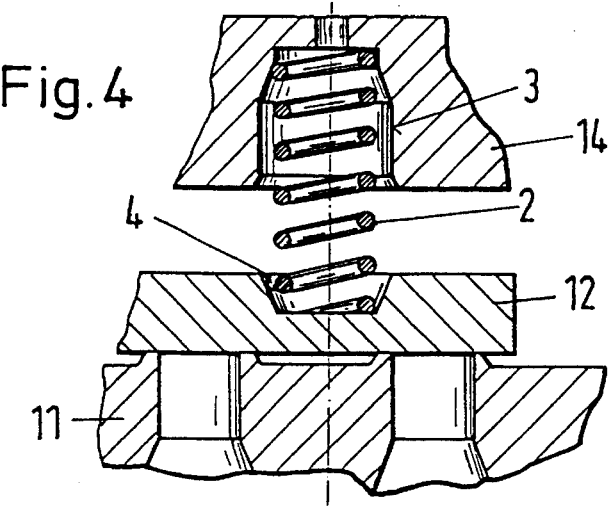

In the exemplified embodiment shown in FIG. 4, the annular plate 12 is again made of plastic, but instead of a knob-like projection a truncated recess 4 is mounted on the top of the annular plate 12, which receives the end of the helical spring 2 at the bottom in FIG. 4. Therefore here the recess 4 forms the guide means for the end of the helical spring and thus for the annular plate 12.

Figure 5:
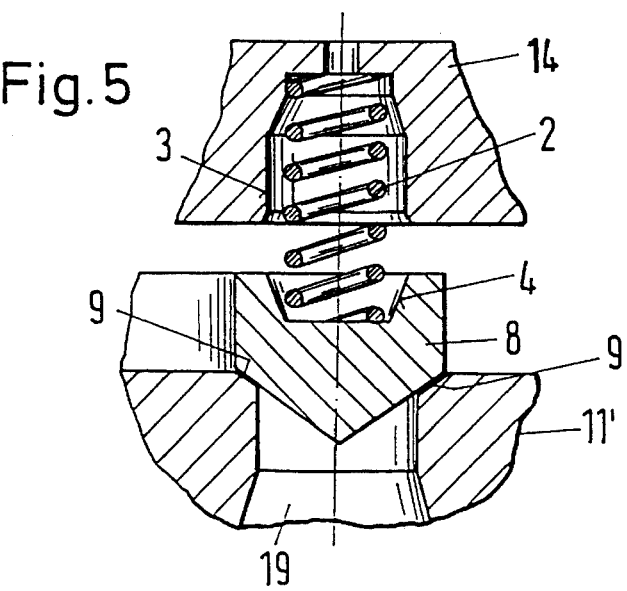

In the exemplified embodiment shown in FIG. 5, instead of an annular plate an annular member 8 made of plastic, the cross-section of which has a five-cornered shape favorable to flow, is provided as a sealing component. Two tapered surfaces of the annular member 8 inclined towards one another at an obtuse angle cooperate with two correspondingly inclined surfaces at the valve seat 11' and thus form sealing surfaces 9. On the upper side in FIG. 5 of the annular member 8 there is provided a recess 4 to receive the lower end of the helical spring 2—as in FIG. 4. Several annular members 8 may be provided concentrically to the axis 7 in the complete valve.

The invention can also be used with the same embodiments in the valves in the inlet connection of the compressor.

What is claimed is:

1. A valve for a piston compressor comprising a valve seat for attachment to a housing of the compressor; an absorber secured to the valve seat and spaced therefrom; an annular sealing component disposed in a space between opposing surfaces of the valve seat and the absorber and being axially movable between the opposing surfaces, the sealing component comprising a plate constructed of a plastic material; at least three helical springs disposed between the absorber and the sealing component, distributed about the sealing component and biasing the sealing component into a closed position against the surface of the valve seat; the plate including a projection for each helical spring which is of unitary construction with the plate and extends into an interior of the spring at a first end thereof; the absorber including a blind bore for each spring, an end of the bore having a diameter selected to engage and secure a second end of the helical spring to the absorber, a remainder of the bore having a diameter larger than an outer diameter of the helical spring; and means for guiding axial movements of the sealing component in the space between the valve seat and the absorber, said guiding means being solely defined by the helical springs and their engagement of the sealing component.

2. A piston compressor comprising a housing with a compressed air outlet and a substantially friction-free operating check valve for closing the outlet and opening it when subjected to a threshold pressure, the valve including a valve seat secured to the housing and having a fluid passage in fluid communication with the outlet; an absorber secured to the valve seat and spaced therefrom to define a space between the absorber and the valve seat; a substantially flat, annular sealing plate disposed and movable in the space for opening and closing the fluid passage, the sealing plate being constructed of a plastic material; at least three blind bores formed in the absorber, overlying the sealing plate and distributed about the plate, each bore having a reduced diameter portion proximate its blind end; a helical spring disposed in each bore having an outer diameter so that the bore portion engages and holds a first end of the spring to thereby secure the spring to the absorber; the plate including a projection for each helical spring which is of unitary construction with the plate and extends into an interior of the spring at a second end thereof, the springs biasing the plate against the valve seat to thereby close the fluid passage, the projection on the sealing plate in engagement with the interior of the springs and the spring anchored in the blind bores of the absorber defining a sole guide for the sealing plate which inhibits relative movements between the springs and the sealing plate in a direction parallel to the valve seat.

* * * * *